Patented Aug. 7, 1945

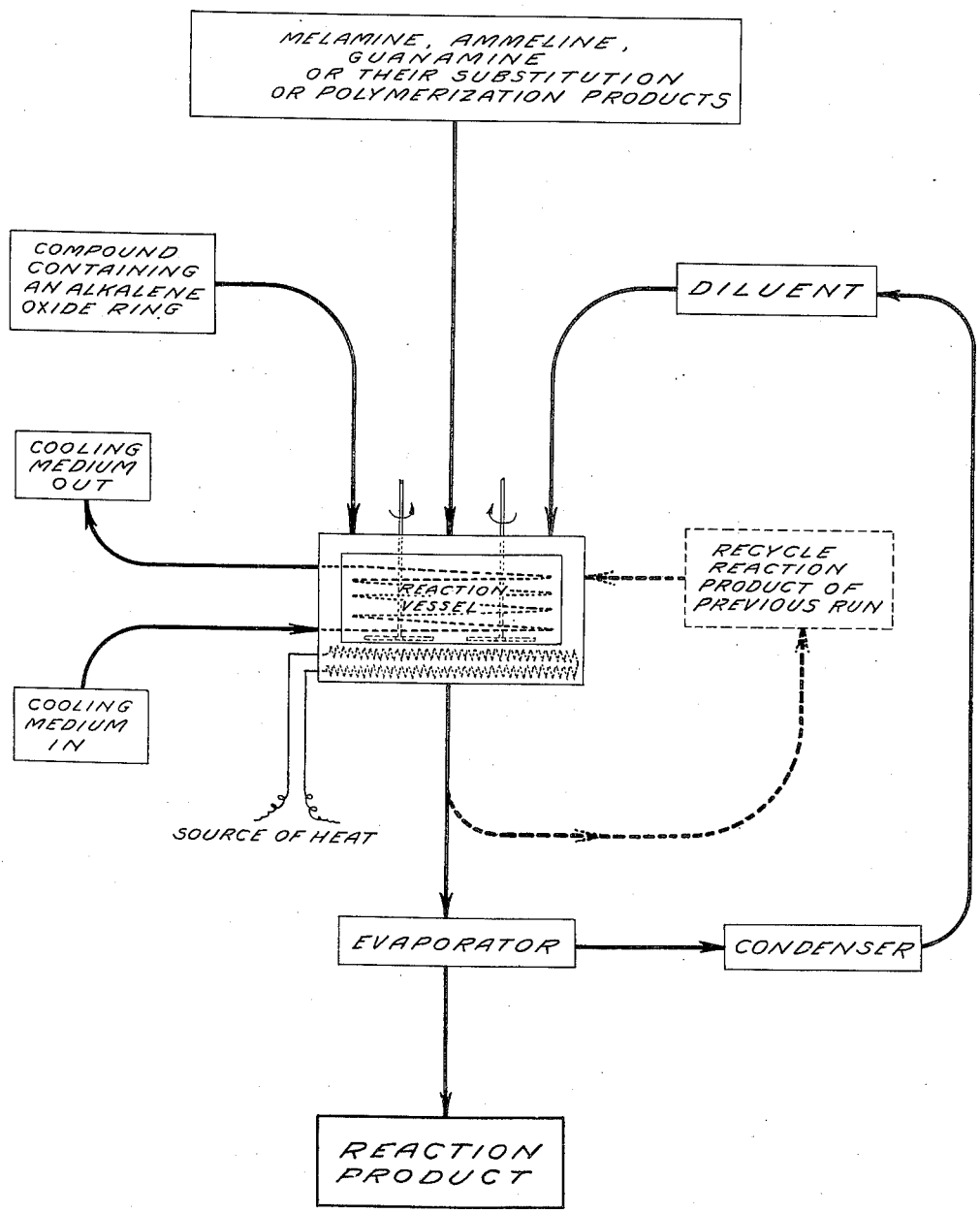

2,381,121

UNITED STATES PATENT OFFICE 2,381,121

CONDENSATION PRODUCTS OF TRIAZINES AND SUBSTITUTE TRIAZINES WITH ALKYLENE OXIDES

Walter P. Ericks, Cos Cob, Conn., assignor to American Cyanamid Company, New York, N. Y., a corporation of Maine Application January 17, 1941, Serial No. 374,834

8 Claims. (Cl. 260—2)

This invention relates to the preparation of new and useful reaction products of triazines and substituted triazines with alkylene oxides.

More particularly, it embraces the preparation of reaction products by reacting triazines such as melamine, ammeline, guanamine and substitution and polymerization products thereof with alkylene oxides such as ethylene oxide, glycidol or compounds capable of yielding an alkylene oxide-containing substance during the condensation reaction.

It is an object of this invention to prepare these compounds cheaply and efficiently. A still further object is to prepare surface active materials which find use as textile and leather assistants and in the paper, lacquer, resin, cosmetic and similar industries as highly effective wetting, emulsifying and detergent agents. The products of this invention are especially useful for softening purposes as well as anti-crease and wrinkle prevention in cloth, leather, fabricoid and similar materials and are particularly valuable when used as alkali and acid resistant wetting, detergent and emulsifying agents, as well as for the resolution of emulsions such as petroleum emulsions. They also find use as mercerizing assistants. Further and more important uses are suggested in the following description.

With these objects in view and such others as may hereinafter appear, the invention consists in the novel products and processes described below and more particularly defined in the claims.

The accompanying flow sheet represents the process diagrammatically. As shown, the necessary reactants are mixed together with a diluent or as alternatively shown in broken lines with a portion of a recycled liquid reaction product. The product is then obtained by evaporation of the diluent.

The compounds of this invention are prepared in general by reacting a triazine, substituted or unsubstituted with a compound containing an ethylene oxide ring. If desired the reaction is accelerated by using a temperature of 150 to 200° C. and a suitable organic or inorganic base, preferably an alkali-metal or alkaline earth metal hydroxide, such as sodium hydroxide, potassium hydroxide, and calcium hydroxide, or pyridine, and the like. Usually the reaction is exothermic and hence must be controlled as by the use of an efficient cooling device. The reaction product is then filtered off, washed and dried on a steam bath. If desired, complete condensation of the reactants is not effected. Instead, the reaction is temporarily arrested and completed only after the product, resinous or waxy or in emulsion form, is applied to a cloth and the latter heated or passed over a hot roller. In place of an alkylene oxide containing compound, an epihalogenhydrin may be used, or a similar substance which has an alkylene oxide group or a group which under the conditions of the reaction forms an intermediate having an alkylene oxide group.

The following examples illustrate the invention in more detail:

Example I 6.3 g. of melamine (0.05 mol.) and 11.1 g. of glycidol (0.15 mol.) were heated slowly with stirring to 130° C. whereupon the external heating was discontinued. The stirring was continued and the temperature rose slowly to 140° C. At this temperature a sudden reaction took place and even after the beaker was placed in ice water, the temperature of the reaction medium rose to 220° C. The product was a non-transparent soft resin, soluble in hot water, from which a precipitate (probably unreacted melamine) was obtained on cooling. Upon heating the resinous product to 250° C. it assumed an amber color, became viscous and was soluble in both hot and cold water.

Example II 1.26 g. of melamine (0.01 mol.) and 7.4 g. of glycidol (0.1 mol.) were heated slowly with constant stirring to 140° C. Even after the reaction mixture and its container were placed into cold water, the reaction temperature rose continuously to 220° C. The product was an amber colored, transparent, very viscous resin which was readily soluble in hot water.

Example III 1.29 g. of 4-N-p-tertiary amylphenyl formoguanamine, M. P. 196 to 197° C. (0.005 mol.) and 3.7 g. of glycidol (0.05 mol.) were heated to 110° C. whereupon an exothermic reaction occurred. The reaction mixture was cooled in an ice bath and stirred constantly while the temperature rose to 220° C. The product was a dark amber colored viscous resin which gave clear foaming solutions in water. It possessed surface active properties in neutral, acid and alkaline solutions.

Example IV

Octadecoxy propylamine hydrochloride was prepared by reacting octadecoxy primary amine with an equimolecular quantity of hydrochloric acid in ethyl alcohol and subsequently filtering off the product obtained.

18.2 g. of octadecoxypropylamine hydrochloride (0.05 mol.) and 3.15 g. of melamine (0.025 mol.) were heated at 200 to 210° C. for 3 hours. The brown colored product obtained was allowed to cool, and then ground and digested in warm water containing an excess of ammonia. The resultant slurry was cooled in an ice bath, filtered, the filter cake was washed with water and digested in hot alcohol containing charcoal. The alcohol extract was filtered and the filtrate was evaporated on a hot plate and subsequently on a steam bath to yield a tan colored wax, solidifying at about 65° C. and weighing about 13 g.

One mol. equivalent of this bis-octadecoxypropyl melamine was reacted in a container with twenty mol. equivalents of glycidol by heating the reactants to 250 C. The product obtained was soluble in cold water and common organic solvents and gave clear foaming solutions. The reaction probably takes place according to the formula:

Bis-octadecoxypropyl melamine+glycidol

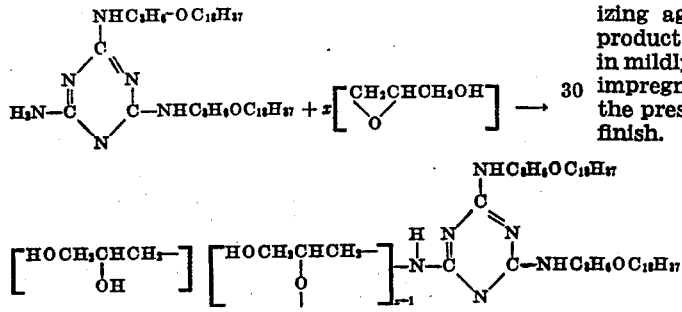

The product was soluble and stable in strong alkaline solutions and exhibited strong wetting properties. It could be used advantageously as a mercerizing assistant.

*Example V*

In another experiment, 7.46 g. of bis-octadecoxypropylmelamine (0.01 mol.) and 14.8 g. of glycidol (0.2 mol.) were heated to 170° C. when an exothermic reaction occurred, the heating being discontinued, sending the temperature to 220° C. The reaction mixture was cooled to 190° C. and then heated to 190° to 200° C. for 15 minutes to yield a brown wax, easily soluble in hot water and readily dispersible in cold water. The product showed excellent softening properties when applied to cellulosic fabrics, yarn or threads.

*Example VI*

6.3 g. of melamine (0.05 mol.) and a plurality of 8.1 g. portions of glycidol (0.15 mol. per portion) up to about two portions (i. e., 16.2 g.) of glycidol were reacted by heating to 155° C. with stirring. At this temperature a rapid rise in temperature occurred and the heating was discontinued, the beaker and its contents being immersed in an ice bath. The temperature of the reaction reached 190° C. and on cooling a white hard resin formed. The product was soluble in hot water, precipitating out upon cooling. This melamine-glycidol condensation product was then heated together with an additional or third 8.1 g. portion of glycidol. At 120° C. an exothermic reaction took place and the temperature rose to 180° C. On cooling a very viscous, opalescent resin was obtained. This resin was readily soluble in hot water without forming a precipitate on cooling. The bottom of the beaker, however, still held a small quantity of unreacted melamine.

This reaction mass was further reacted with a fourth 8.1 g. portion of glycidol. The reaction mixture was stirred and heated to 90° C. at which temperature the application of external heat was discontinued and by continuing the stirring of the mixture, the temperature was maintained at 90° C. for about 15 minutes because of the exothermic reaction which set in. When the temperature began to drop, a small quantity (about 5 cc.) of water was added, the mixture was heated to 140° C. and then allowed to cool. A pale yellow, viscous resin was obtained, readily soluble in water.

*Example VII*

12.7 g. of ammeline (0.1 mol.) was dissolved in 50 cc. of water containing 4.2 g. of sodium hydroxide of 96% strength. This solution was heated under reflux to a boiling temperature whereupon external heating was discontinued and 22.2 g. of glycidol was added at such a rate that the solution was held in its boiling state. After all the glycidol had been added the solution was refluxed for an additional 15 minutes. The addition of a neutralizing agent yielded a resinous precipitate. The product was isolated and could be easily dissolved in mildly alkaline aqueous solutions. Cotton cloth impregnated with this solution and then cured in the presence of acetic acid vapors gave a durable finish.

*Example VIII*

In another experiment, 12.7 g. of ammeline (0.1 mol.) and 22.7 g. of glycidol (0.3 mol.) were heated with stirring to 140° C. whereupon a sudden exothermic reaction caused the temperature to rise to 210° C. Cooling the mass, yielded a soft amber-colored transparent resin which was sparingly soluble in hot water.

*Example IX*

Valeroguanamine was prepared by the following method:

50 g. of guanidine carbonate was dissolved in water and then neutralized with valeric acid. This solution was then evaporated in a porcelain dish and the product, a stiff white mass, was heated in a flask at 220 to 230° C. for 1½ to 2 hours or as long as any trace of ammonia was evolved. The liquid reaction medium was treated with an excess of sodium hydroxide until it was all in solution. Upon cooling, the valeric acid base separated out in the form of rhombic needles. During this interval, ammonia was evolved and cyclicization was effected. The product was precipitated in the form of a thick crystalline mass which was collected on a filter, the filter cake was washed until the washing were no longer alkaline, whereupon the filter cake was dried and recrystallized from hot water. The product, valeroguanamine, solidified as a thick crystalline mass which was collected on a filter, washed until no longer alkaline, dried and recrystallized from hot water. The purified product crystallized in the form of shiny needles having a M. P. of 172 to 173° C., soluble with difficulty in cold water, but more easily soluble in hot water and readily soluble in alcohol and ether. One mol. equivalent of valeroguanamine was reacted with ten mol. equivalents of glycidol by the method described in Example III. The viscous resin obtained was readily soluble in water.

Example X

In a manner similar to that given in Example IX hexano guanamine was prepared by using caproic instead of valeric acid. The product, however, even after the addition of sodium hydroxide could not be recrystallized. Hence the reaction mixture itself was used without further purification by dissolving the unpurified base in dilute hydrochloric acid, the resultant solution filtered and the filtrate partially evaporated and allowed to form a crystalline product. This crystalline product was dissolved in water and precipitated with sodium hydroxide to yield the desired product, hexanoguanamine having a M. P. of 177 to 178° C. The compound was reacted with 10 mol. equivalents of glycidol giving a product which was readily soluble in water.

Example XI 171 g. of stearic acid (0.6 mol.) was dissolved in 300 cc. of denatured ethyl alcohol. The solution was heated to 65° C. and 36.3 g. of guanidine (0.3 mol.) added, with occasional stirring, while carbon dioxide was being evolved. This reaction mixture was heated on a steam bath until all the guanidine carbonate had dissolved and the alcohol entirely evaporated. The product remaining, guanidine stearate, was heated while being stirred for 1 hour and 45 minutes at 215 to 230° C. on a hot plate. During this interval ammonia was evolved and a cyclicization was effected and the desired product, stearoguanamine, deposited on the sides of the container as a dark brown material. Purification of this crude product was difficult and therefore it was condensed without further isolation with ten mol. equivalents of glycidol by heating at 110 to 220° C. The resultant product gave turbid dispersions which foamed readily. It was found to be a useful wetting, emulsifying, detergent and softening agent.

In addition to ethylene oxide and glycidol, various other ethylene oxide ring compounds may be used, namely propylene oxide, isobutylene oxide, tetramethylene oxide, n-hexyl-ethylene oxide as well as ethylene chlorohydrin, epichlorhydrin, chloroglycerol, and similar and corresponding compounds having a reactive ethylene oxide ring present or which are capable of forming an ethylene oxide ring in the course of the reaction and their derivatives and substitution products may be used. Various alkylene oxides or alkylene oxide containing compounds may be used. However, if the compound chosen for the reaction with a triazine has a low boiling point, i. e. ethylene oxide, propylene oxide, and the like, it is advantageous to carry out the reaction in a closed system and under elevated pressure in order to raise the temperature of the reaction to a point at which the reaction proceeds at a sufficiently rapid rate to make the process commercially feasible.

Example XII 13.25 g. of lauroguanamine (0.05 mol.) and 22.2 g. of glycidol (0.3 mol.) were heated with stirring to 130° C. whereupon an exothermic reaction took place, continuing for about 15 minutes. During this interval, the temperature of the reaction was maintained at 132° to 137° C. by cooling the reaction vessel in a water bath. Cooling the mass, yielded a pale yellow, transparent, viscous resin which was readily soluble in hot water. Its solutions foamed abundantly upon shaking and displayed highly desirable wetting and softening properties.

These reaction products of compounds containing an ethylene oxide ring and a triazine or a substituted triazine are of particular utility in the formation of surface-active agents of the cation-active type. For this reason they are well suited for wetting and softening wool, cotton, cellulose acetate, cellulose nitrate, viscose and similar materials. They are also useful in the emulsification of mineral oils, glycerides, fats, oils and the like. They find application in the formulation of printing inks, dye pastes, dye baths, leather preparations and flotation agents. By their use it is possible to secure fullness, resistance to unraveling, and increased wet strength in rayons and other fabrics. They reduce the tendency of treated cloth materials to wrinkle or crease.

These products, particularly those having waxy or paste-like properties are useful assistants in the textile, leather, paper, rubber, lacquer and similar industries. In many of the examples, particularly when polyamines are incorporated, or when temperatures are not carefully regulated, mixtures result containing several different substances. When used as textile assistants or in leather and similar processing industries it is not necessary to isolate the desired products; instead, the mixtures can be used directly.

The products described herein may be further reacted with an amine, either primary or secondary, or with a fatty acid to yield highly desirable and useful surface-active compounds.

In addition to the triazines above mentioned various others may be reacted with the alkylene oxides. Among such compounds may be specifically cited guanamides, ammelides, cyanuric chloride, their substitution products such as cyanuric acid or polymerization products of these triazines such as melam, melem, melon, hydromelonic acid, and the like. Further examples of substituted melamines include mono-, di-, and tri-laurylmelamine, mono-, di-, and tri-octadecylmelamine, benzyl melamine, mono-, di-, and triphenyl melamine and their isomers, monoformyl melamine, and other monoacyl derivatives, diacetyl melamine, triamino-melamine, hexa-chloro-triphenyl melamine and other cyanuric chloro-anilides, tri-p-diphenylene-diamino-melamine, tri-carbamine melamine, 2,4,6-tri-p-naphthyl melamine and the like. Among the ammelines such as thio ammeline, 4,6-N-dimethylammeline, 4,6-N-diethylammeline, monolaurylammeline or 4,6-dilaurylammeline, monostearylammeline or 4,6-distearylammeline, mono- or di-phenyl ammeline, and the like, may be reacted with ethylene oxide, glycidol and similar alkylene oxide containing compounds. Among the guanamines, such compounds as the following may be reacted with alkylene oxides: benzoguanamine, toluoguanamine, isobutylformoguanamine, 4-N-pentadecylformoguanamine, 4-N-piperidylformoguanamine, 4-N-benzyl stearoguanamine, 4-N-phenyl lauroguanamine, the amidoguanamines, and the like.

It is to be understood that the examples are merely specific embodiments and that the invention is not limited thereto, but is to be broadly construed within the scope of the appended claims.

I claim:

1. A condensation product of glycidol and 4-N-p-tertiary amylphenyl formoguanamine.

2. The process for the preparation of condensation products which comprises reacting a compound selected from the group consisting of a formoguanamine having an N substituted hydrocarbon radical, valeroguanamine, hexanoguanamine, lauroguanamine and stearoguanamine, each member of the group containing a replaceable hydrogen attached to a nitrogen atom, with a compound containing an alkylene oxide ring.

3. The process for the preparation of condensation products which comprises reacting a compound selected from the group consisting of a formoguanamine having an N substituted hydrocarbon radical, valeroguanamine, hexanoguanamine, lauroguanamine and stearoguanamine, each member of the group containing a replaceable hydrogen attached to a nitrogen atom, with a compound containing an ethylene oxide ring.

4. The process for the preparation of condensation products which comprises reacting a compound selected from the group consisting of a formoguanamine having an N substituted hydrocarbon radical, valeroguanamine, hexanoguanamine, lauroguanamine and stearoguanamine, each member of the group containing a replaceable hydrogen attached to a nitrogen atom, with glycidol.

5. The condensation product of a compound selected from the group consisting of a formoguanamine having an N substituted hydrocarbon radical, valeroguanamine, hexanoguanamine, lauroguanamine and stearoguanamine, each member of the group containing a replaceable hydrogen attached to a nitrogen atom, with a compound containing an alkylene oxide ring.

6. The condensation product of a compound selected from the group consisting of a formoguanamine having an N substituted hydrocarbon radical, valeroguanamine, hexanoguanamine, lauroguanamine and stearoguanamine, each member of the group containing a replaceable hydrogen attached to a nitrogen atom, with a compound containing an ethylene oxide ring.

7. A condensation product of glycidol and valeroguanamine.

8. A condensation product of glycidol and stearoguanamine.

WALTER P. ERICKS.